(12) United States Patent
Wittenstein et al.

(10) Patent No.: US 8,332,212 B2
(45) Date of Patent: Dec. 11, 2012

(54) METHOD AND SYSTEM FOR EFFICIENT PACING OF SPEECH FOR TRANSCRIPTION

(75) Inventors: Andreas Wittenstein, Woodacre, CA (US); Mark Cromack, Santa Ynez, CA (US)

(73) Assignee: Cogi, Inc., Santa Barbara, CA (US)

( * ) Notice: Subject to any disclaimer, the term of this patent is extended or adjusted under 35 U.S.C. 154(b) by 708 days.

(21) Appl. No.: 12/456,586

(22) Filed: Jun. 17, 2009

(65) Prior Publication Data

US 2009/0319265 A1 Dec. 24, 2009

Related U.S. Application Data (60) Provisional application No. 61/132,503, filed on Jun. 18, 2008.

(51) Int. Cl.
| | |
|---|---|
| G10L 19/14 | (2006.01) |
| G10L 15/20 | (2006.01) |
| G10L 15/00 | (2006.01) |
| G10L 13/08 | (2006.01) |
| G10L 13/00 | (2006.01) |
| G10L 11/00 | (2006.01) |
| G10L 21/00 | (2006.01) |

(52) U.S. Cl. ........ 704/211; 704/233; 704/241; 704/258; 704/260; 704/270

(58) Field of Classification Search .................. 704/211, 704/233, 241, 270, 258, 260
See application file for complete search history.

(56) References Cited

U.S. PATENT DOCUMENTS

| | | | | |
|---|---|---|---|---|
| 4,592,085 | A | * | 5/1986 | Watari et al. .................. 704/254 |
| 5,008,941 | A | * | 4/1991 | Sejnoha ........................ 704/222 |
| 5,305,420 | A | * | 4/1994 | Nakamura et al. ............ 704/271 |
| 5,787,395 | A | * | 7/1998 | Minamino ..................... 704/255 |
| 6,317,716 | B1 | * | 11/2001 | Braida et al. .................. 704/275 |
| 6,338,038 | B1 | * | 1/2002 | Hanson ......................... 704/500 |
| 6,442,518 | B1 | * | 8/2002 | Van Thong et al. ........... 704/235 |
| 6,687,665 | B1 | * | 2/2004 | Oda et al. ...................... 704/207 |
| 6,757,361 | B2 | * | 6/2004 | Blair et al. .................... 379/67.1 |
| 6,766,294 | B2 | * | 7/2004 | MacGinite et al. ........... 704/235 |
| 6,910,005 | B2 | * | 6/2005 | Bartosik ........................ 704/201 |
| 7,092,496 | B1 | * | 8/2006 | Maes et al. ................. 379/88.01 |
| 7,107,213 | B2 | * | 9/2006 | Oda et al. ...................... 704/234 |
| 7,337,113 | B2 | * | 2/2008 | Nakagawa et al. ........... 704/233 |
| 2004/0078195 | A1 | * | 4/2004 | Oda et al. ...................... 704/207 |
| 2004/0210437 | A1 | * | 10/2004 | Baker ............................ 704/251 |
| 2006/0149535 | A1 | * | 7/2006 | Choi et al. ..................... 704/207 |
| 2006/0177799 | A9 | * | 8/2006 | Stuart et al. ................... 434/112 |
| 2007/0100626 | A1 | * | 5/2007 | Miller et al. .................. 704/258 |
| 2007/0124147 | A1 | * | 5/2007 | Gopinath et al. ............. 704/257 |

* cited by examiner

*Primary Examiner* — Eric Yen (74) *Attorney, Agent, or Firm* — Mark Rodgers (57) ABSTRACT

A method and system for improving the efficiency of real-time and non-real-time speech transcription by machine speech recognizers, human dictation typists, and human voicewriters using speech recognizers. In particular, the pacing with which recorded speech is presented to transcriptionists is automatically adjusted by monitoring the transcriptionists' output by comparing the output acoustically or phonetically to the presented recorded speech as well as monitoring the resulting transcription, and accordingly adjusting the pacing.

4 Claims, 7 Drawing Sheets

METHOD AND SYSTEM FOR EFFICIENT PACING OF SPEECH FOR TRANSCRIPTION

RELATED APPLICATIONS

This application claims priority to U.S. Provisional Application Ser. No. 61/132,503, filed Jun. 18, 2008

BACKGROUND OF THE INVENTION

Most of the linguistic information people communicate is in the form of speech, and most people can speak much faster than they can communicate linguistic information by any other means. Yet most people can read much faster than they can listen to speech, even if the speech is recorded and artificially sped up. And whereas recorded textual information can be visually scanned and searched with great ease and rapidity, searching or scanning recorded speech is painfully tedious, a discrepancy exacerbated by today's networked computer systems, which make it possible to search enormous quantities of textual data in an instant, but cannot begin to penetrate voice data. Compared to speech, text is also far easier to edit, organize, and process in many other ways.

Accurate, affordable, and rapid speech transcription could bridge the advantages of speech with the advantages of text; however, no existing solution meets all three of these criteria. Trained human dictation typists set the standard for accuracy, but they are slow and expensive. Automatic speech recognizers are the most affordable, but their accuracy for normal conversational speech of most speakers in most situations is, in the current state of the art, unacceptably low for most purposes. Trained human voicewriters substitute their clearly enunciated speech as input to automatic speech recognizers, and correct the remaining errors in the output, thereby matching the accuracy of typists while retaining much of the speed of automatic speech recognition; but trained voicewriters are even more expensive than dictation typists.

Highly trained voicewriters are typically employed in formal public situations where the source speech is already well-enunciated and easily understood on first hearing, such as court reporting and public speech transcription, where real-time transcription is essential; as well as for dictation transcription. And in these situations, they can generally keep up with the speech in real time on the fly, though a second pass through the transcript is generally needed to correct errors introduced by the automatic speech recognizer.

For everyday conversational speech, particularly telephone speech, multiple hearings are commonly required, not only for typists and less-skilled voicewriters, who can rarely keep up with the pace of the original speech, but even for highly skilled voicewriters. This is due to a number of factors, including signal degradation issues such as bandpass filtering, line noise, and codec artifacts; enunciation issues such as mumbling, whispering, slurring, and clipping; pronunciation issues such as stutters, splutters, hems and haws, spoonerisms, and other phonological speech errors; lexical issues such as colloquialisms, localisms, slang, private vocabulary, and euphemisms; syntactic issues such as false starts and repetitions, vacuous filler phrases, and incoherence; and pragmatic issues such as presuppositions, interruptions, and talking over one another.

Whenever a single hearing is insufficient for accurate transcription, whether because of speed or unintelligibility, transcribers spend an inordinate amount of time rewinding the audio recording, searching for an appropriate starting point to provide sufficient context, and replaying the audio.

Some systems can adjust the playback tempo without affecting the pitch or formants of the speech, which can alleviate a speed mismatch between the original speech and the transcriber, but only in an average way, since any constant playback tempo still tends to alternate between being too slow and too fast for the transcriptionist's capabilities.

Some systems provide a foot pedal to permit a human transcriber to pace the playback by controlling such parameters as the playback tempo, duration, and repetition, leaving the transcriber's hands free for typing, but this requires additional effort on the part of the transcriber, as well as additional fault-prone electromechanical hardware.

Some specific examples in the prior art include:

U.S. Pat. No. 4,207,440 in which Schiffman describes the basic technique of having a transcriptionist manually control the playback speed of recorded speech in order to control its pace. Schiffman does not anticipate any kind of automated dynamic rate control of the speech to be transcribed nor is playback rate linked to the transcriptionists output.

U.S. Pat. No. 6,490,553 in which Van Thong et al describe a system which uses voice recognition of the input speech and alters its playback rate to meet a target rate. Van Thong does not perform any examination of the transcriptionists output and does not attempt to control the playback rate to dynamically adapt to the pace that the transcriptionist is performing at.

U.S. Pat. No. 6,952,673 in which Amir et al describe a system which can change the playback speed of input speech based on the typing speed of a transcriptionist. Amir's "rate" is based on monitoring the transcriptionists typing pace in terms of characters, keystrokes and words per unit time and then attempting to relate that typing rate back to the input speech. Amir does not perform any kind of acoustic alignment between a synthesized version of the transcript and the input speech, nor does he anticipate using an acoustic alignment between a voice-writer's speech and the input speech.

U.S. Pat. No. 7,412,378 in which Lewis et al describe a system to dynamically match a speech output rate to a user's spoken speech input rate. Lewis assumes either an existing alternative text for the recorded speech, or the use of a transcription server to determine the number of words in the recorded speech in order to know its rate. The purpose of this invention is to efficiently create a transcription of recorded speech where no transcription or alternative text for it exists. This invention does not rely on knowing the number of words in the recorded speech—it performs an acoustic alignment between the recorded speech and either a synthesized version of the ongoing transcription output, or the audio of the voice writers input speech.

SUMMARY OF THE INVENTION

The present invention is a method and system for improving the efficiency of real-time and non-real-time speech transcription by machine speech recognizers, human dictation typists, and human voicewriters using speech recognizers. In particular, the present invention automatically adjusts the pacing with which recorded speech is presented to transcriptionists, by monitoring the transcriptionists' output and comparing it acoustically or phonetically to the presented recorded speech—directly to the speech produced by voicewriters, or to speech resynthesized from the text produced by speech recognizers and human typists—as well as monitoring the resulting transcription, and accordingly adjusting pacing parameters such as the spacing, time, and duration of pauses; the duration of the prior context, current selection, and posterior context; the playback tempo of the prior context, the current selection, and the posterior context; and the frequency and number of repetitions; while permitting human transcribers to conveniently override these parameters. To improve the accuracy of the comparison and alignment between the original speech and the voicewriters' and resynthesized renditions, the system adapts to each speaker's vocal characteristics, such as pitch, timbre, and timing, and compensates for corresponding differences between the renditions. For non-verbatim transcription, depending on transcription settings, the system also compensates for the transcriber's editing of stutters, false starts, and repetitions; and hems and haws and other vacuous fillers, by referring to a user-modifiable acoustic-phonetic dictionary of excluded speech sounds and non-speech sounds. A textual censoring dictionary also helps the system ignore verbal commands to the speech recognizer. Finally, the pacer also aligns the transcription with the original and voicewriter's speech, to facilitate correction and out-of-sequence playback in general.

BRIEF DESCRIPTION OF THE DRAWINGS

The invention will be better understood by referring to the accompanying drawings

DETAILED DESCRIPTION OF THE INVENTION

In the following description of a system and method for improving the efficiency of speech transcription, numerous specific details, such as specific voice parameters, speech parameters, typing parameters, linguistic parameters, and acoustic and phonetic representations are set forth in order to provide concrete examples to facilitate a more thorough understanding of the present invention. To those skilled in the art, however, it will be apparent that the present invention may be practiced without these specific details. Moreover, certain well-known features have been described only in general terms, so as not to unnecessarily obscure the present invention.

In the preferred embodiment of this invention, the transcription-pacing system described herein is incorporated into a networked computer system capable of receiving the original speech from a managing service agent as it is needed, and transmitting the transcription and optionally the transcriptionist's input back to the service agent as they are produced, thereby enabling the service agent to monitor the progress of the transcription and deliver it on the fly as soon as possible. This embodiment makes it possible for the managing service agent to adjust the speed of transcription according to its urgency by parcelling out the speech to a varying number of possibly redundant transcriptionists of varying proficiency.

This embodiment also makes it possible to improve the transcription accuracy by accumulating a central database of transcribed speech for the continual training of the automatic speech recognizers as well as the transcriptionists.

In the description that follows, the speech to be transcribed may be broken up into many snippets, or utterances, to be transcribed separately; and the speech transcription process applied to each utterance is broken down into many steps to be applied separately. In the preferred embodiment, the transcription pacing system can transcribe these utterances in parallel, and can pipeline the processing steps applied to each utterance, in order to provide real-time transcription when desired. Thus a single transcription manager managing the transcription of a given stream or body of original speech, such as a live telephone conference, can manage a multiplicity of transcribers and other components operating concurrently on different, possibly overlapping portions of the speech; and for a given utterance, each successive step of the transcription process can overlap with the neighboring steps, beginning as soon as enough data is available for it to proceed on the fly, without having to wait for any preceding step to run to completion. For non-real-time transcription, in contrast, where low cost is more important than speed, the transcription pacing may feed the entire body of speech to a single transcriber and perform each step at a time when the cheapest resources are available.

Figure 1:
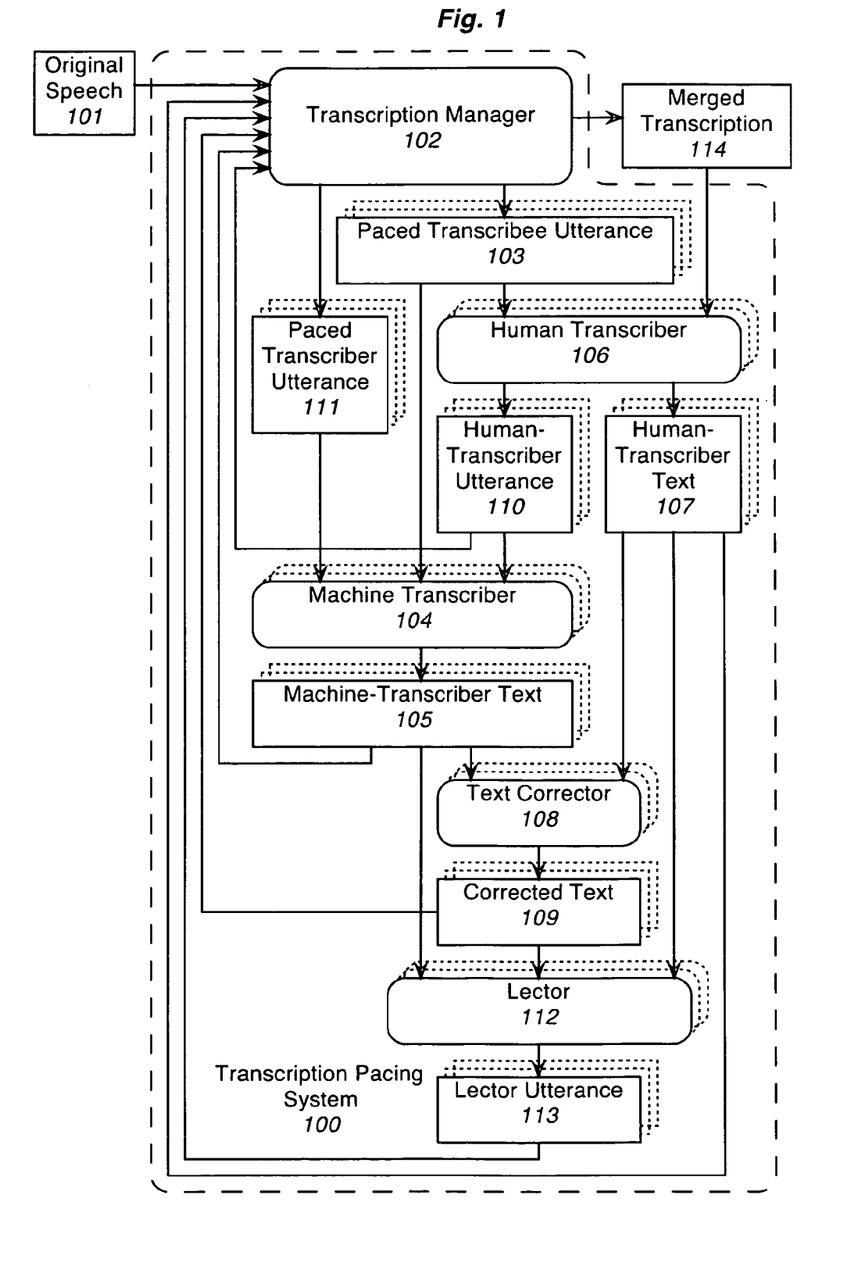
FIG. 1 is a top-level information-flow diagram of one embodiment of the transcription pacing system.

As shown in top-level information-flow diagram FIG. 1, the transcription pacing system 100 disclosed herein comprises transcription manager 102; one or more transcribers, which may be human transcribers 106 or machine transcribers 104; one or more text correctors 108; and one or more lectors 112. Transcription pacing system 100 uses these components to efficiently transcribe original speech input 101 into merged transcription output 114.

Transcription manager 102 inputs original speech to be transcribed 101 and parcels it out as one or more paced transcribee utterances 103 to one or more transcribers, including machine transcribers 104 and human transcribers 106. Transcription manager 102 is described further under FIG. 2.

A machine transcriber 104 uses automatic speech recognition to transcribe a paced transcribes utterance 103 directly into machine-transcriber text 105, which transcription pacing system 100 feeds back to transcription manager 102 either unchanged, or, after passing it through a text corrector 108, as corrected transcriber text 109.

A human transcriber 106 may similarly use dictation typing skills to transcribe a paced transcribee utterance 103 directly into human-transcriber text 107, which transcription pacing system 100 feeds back to transcription manager 102 either directly or, after using a text corrector 108 to correct for spelling errors and typing errors, as corrected transcriber text 109. Alternatively, a human transcriber 106 may use voicewriting skills to rearticulate a transcribee utterance 103 as human-transcriber utterance 110 into a machine transcriber 104, either directly, or as paced human-transcriber utterance 111 via transcription manager 102. The machine transcriber 104 in turn transcribes human-transcriber utterance 110 or paced human-transcriber utterance 111, which is fed back to transcription manager 102 as machine-transcriber text 105 or, after correction by a text corrector 108, as corrected transcriber text 109.

In addition to correcting orthographical and typographical errors, a text corrector 108 can also serve to distinguish typed commands from transcription text and shunt them off to the appropriate command interpreter (not shown). A text corrector may also be used to censor text, for example in real-time broadcasting situations in jurisdictions where certain phrases are taboo.

Transcription manager 102 merges the individual utterance transcriptions, including machine-transcriber texts 105 and corrected human-transcriber texts 109, as appropriate, on the fly as the transcriptions are produced, into merged transcription 114, and recursively outputs the merged transcription to one or more human transcribers 106 for correction until no more errors are found and no more unacceptable ambiguities remain. Ambiguities in the merged transcription may either arise from the merging of conflicting parallel or overlapping transcriptions by different transcribers, or may originate from an individual transcriber offering multiple transcription choices. When a human transcriber 106 selects a passage of merged transcription 114 to be corrected, transcription manager 102 presents transcribee utterance 103 corresponding to the selected text to the human transcriber. To correct an error, the human transcriber then retranscribes the passage either directly to text 107, or by re-uttering it to a machine transcriber 104 for automatic transcription. To disambiguate a passage with multiple transcriptions, the human transcriber either selects the correct transcription or transcribes the passage directly to text. For ambiguities which cannot be corrected, transcribers can utter or type special tokens indicating, for example, that a phrase is ambiguous, unrecognized, or unintelligible.

In order to precisely correlate a transcriber text with the corresponding transcribee utterance, machine lector 112 uses automatic speech synthesis to read machine-transcriber text 105 or human-transcriber text 109 into machine lector utterance 113, which is fed back to transcription manager 102. This correlation is needed for accurate transcription progress monitoring, merged transcription assembly, and re-presentation of transcribee utterances corresponding to randomly selected text passages for the purpose of correction.

Figure 2:
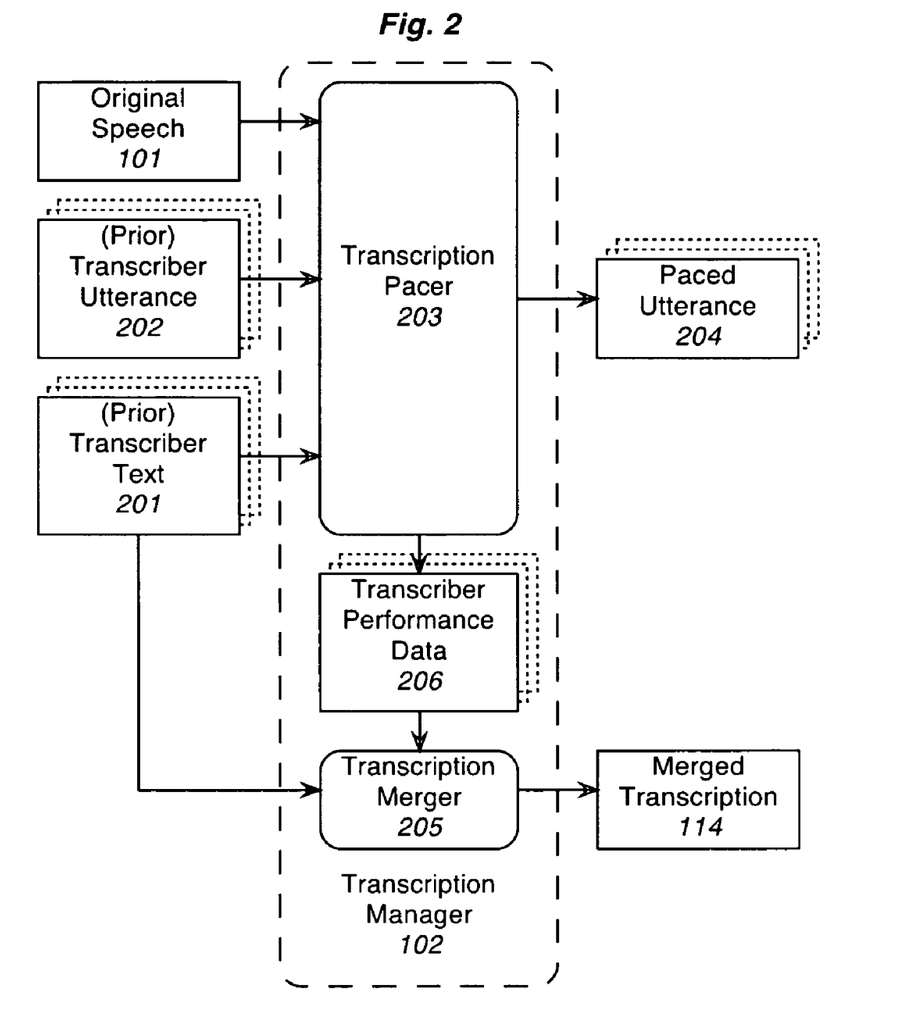
FIG. 2 is an information-flow diagram of one embodiment of the transcription manager.

As shown in information-flow diagram FIG. 2, transcription manager 102 comprises transcription pacer 203 and transcription merger 205. It uses these components to parcel original speech 101 into paced utterances 204 for transcription optimally paced for each transcriber, and to assemble the resulting transcribed texts 201 into final merged transcription 114.

Transcription pacer 203 inputs prior transcriber texts 201, including machine-transcriber texts 105 and human-transcriber texts 109 (see FIG. 1), as available; and prior transcriber utterances 202, including human-transcriber utterances 110, paced human-transcriber utterances 111, and machine lector utterances 113, as available. Transcription pacer correlates prior transcriber texts 201 and corresponding prior transcriber utterances 202 with each other and with original speech 101 to evaluate transcribers' performance, and parcels out further paced utterances 204 to available transcribers accordingly at a pace optimizing the transcription efficiency, where paced utterances 204 are either transcribes utterances 103 from original speech 101, or paced transcriber utterances 111. Transcription pacer 203 also produces transcriber performance data 206 for each transcriber as a by-product. Transcription pacer 203 is described further under FIG. 3.

Transcription merger 205 inputs transcriber texts 201 and merges them, on the fly as they are produced and corrected, into merged transcription 114, with the help of transcriber performance data 206 produced by transcription pacer 203. Transcription merger 205 is described further under FIG. 7.

Figure 3:
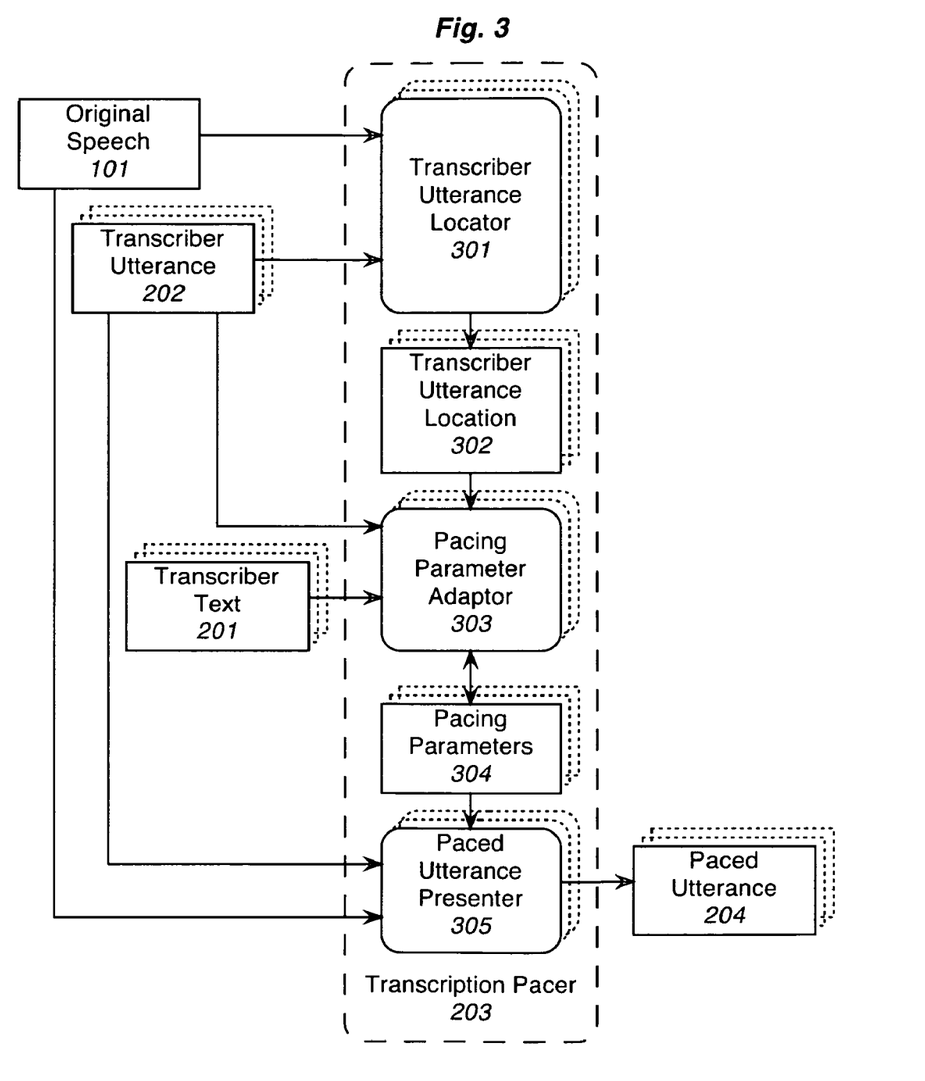
FIG. 3 is an information-flow diagram of one embodiment of the transcription pacer.

As shown in information-flow diagram FIG. 3, transcription pacer 203 comprises one or more transcriber utterance locators 301, one or more pacing parameter adaptors 303, and one or more paced utterance presenters 305. It uses these components to track the progress and performance of the transcribers and accordingly to select further utterances from original speech 101 and present them to the transcribers as optimally paced utterances 204 for efficient transcription.

Whenever a transcriber finishes transcribing a paced utterance 103 (see FIG. 1) into transcriber text 201, transcription pacer 203 feeds a transcriber utterance locator 301 the associated transcriber utterance 202, which may be a human-transcriber utterance 110 in the case of a human voicewriter, a lector utterance 113 in the case of a direct machine or human transcription, or a machine transcription of a paced transcriber utterance. The transcriber utterance locator 301 compares the transcriber utterance 202 to original speech 101 in order to determine transcriber utterance location 302 within original speech 101. Transcriber utterance locator 301 is described further under FIG. 4.

Transcription pacer 203 in turn feeds transcriber utterance location 302, along with associated transcriber text 201 and transcriber utterance 202, to a pacing parameter adaptor 303, which uses these pieces of information to predict the performance of the responsible transcriber and to adjust pacing parameters 304 for that transcriber accordingly. Pacing parameter adaptor 303 is described further under FIG. 5.

Whenever transcription pacer 203 gives a transcriber material to transcribe, whether part of original speech 101 or human-transcriber utterance 202, it uses the pacing parameters 304 specific to that transcriber to select the utterance to be transcribed and to present it as paced utterance 204 optimally paced for that transcriber. Paced utterance presenter is described further under FIG. 6.

Figure 4:
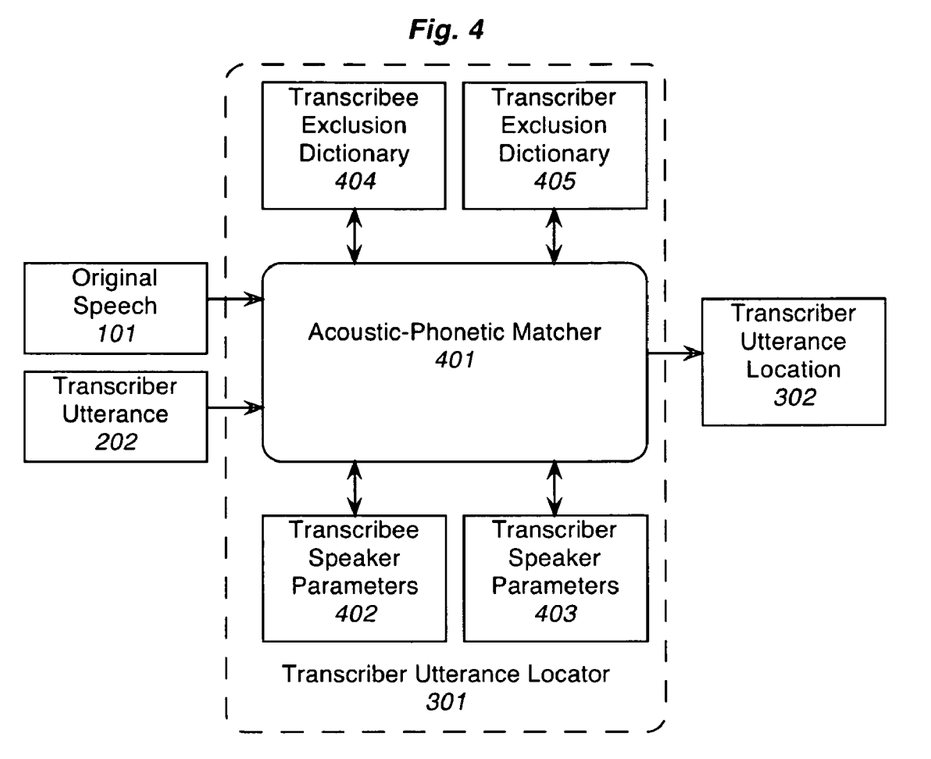
FIG. 4 is an information-flow diagram of one embodiment of the transcriber utterance locator.

As shown in information-flow diagram FIG. 4, transcriber utterance locator 301 uses acoustic-phonetic-matcher 401 to compare original speech 101 with transcriber utterance 202, and outputs transcriber utterance location 302. Transcriber utterance 202 may be either human-transcriber utterance 110, or lector utterance 113 deriving from either human-transcriber text 109 or machine-transcriber text 105. Note that when using a machine lector for written languages such as Chinese, Japanese, Hebrew, and Arabic in which the pronunciation of graphemic words is heavily dependent on the context, use of a tightly integrated speech synthesizer offering multiple readings is advantageous, especially for utterances representing incomplete phrases or sentences.

Transcriber utterance location 302 consists of time correspondence data relating the acoustic phonetic units in transcriber utterance 202 to the corresponding acoustic phonetic units within original transcribee speech 101.

Note that in the case of a machine lector utterance deriving from a machine-transcriber text, it may be possible in a tightly integrated system to obtain transcriber utterance location 302 directly from intermediate data produced by the speech recognizer and speech synthesizer.

Acoustic-phonetic matcher 401 uses a sequence-matching algorithm, such as the well-known Viterbi dynamic-programming algorithm, applied either directly to segments of the acoustic waveforms or to any appropriate transformation thereof, such as the well-known Karhunen-Loève transform, autocorrelation, spectrum, cepstrum, linear-prediction coefficients, or area-coefficients.

To improve the accuracy of the acoustic-phonetic match, transcriber utterance locator 301 takes into account speaker-specific acoustic phonetic parameters 402 of the transcribee and 403 of the transcriber or lector, including such well-known speaker parameters as loudness, pitch, formants, and timing parameters such as the durations of prosodic feet, syllables, moras, and phones. Conversely, at the conclusion of the matching process, transcriber utterance locator 301 updates transcribee speaker parameters 402 and transcriber speaker parameters 403 from the actual values found in the matched utterance.

To further improve the accuracy of the acoustic-phonetic match, transcriber utterance locator 301 takes into account sounds occurring in original speech 101 or in transcriber utterances 202 which may be excluded from the match, which it does by maintaining transcribee exclusion dictionary 404 and transcriber exclusion dictionary 405, respectively. These typically include such vocal sounds as hiccups, coughs, puffs, gasps, sniffles, snorts, sneezes, throat clearings, lip smacks, and idiosyncratic vocal tics. They may also include brief nonvocal sounds which may be conveniently excluded by this means when occurring in pauses, including telephone sounds such as DTMF tones, call-waiting tones, and case crackling, as well as background sounds such as door slams, chair creaks, and car horns.

When producing non-verbatim transcriptions, transcribee exclusion dictionary 404 may also be used to exclude from the match such words and phrases uttered by transcribee which the transcriber may omit from the transcription, typically comprising expletives such as "um", "uh", "well", "like", "you know", and cuss-words.

Note that transcribee exclusion dictionary 404 may be advantageously shared by a machine transcriber in a tightly integrated system.

When transcriber utterance 202 omits a substantial sound not listed in transcribee exclusion dictionary 404, or introduces a substantial sound not listed in transcriber exclusion dictionary 405, the transcription pacing system alerts a human transcriber to repair the discrepancy by either correcting the transcription or adding the sound to the respective exclusion dictionary.

When transcriber utterance 202 or transcriber text 201 contains a special token indicating that a phrase is unrecognized or unintelligible, that token acts as a wildcard in the acoustic-phonetic match.

Figure 5:
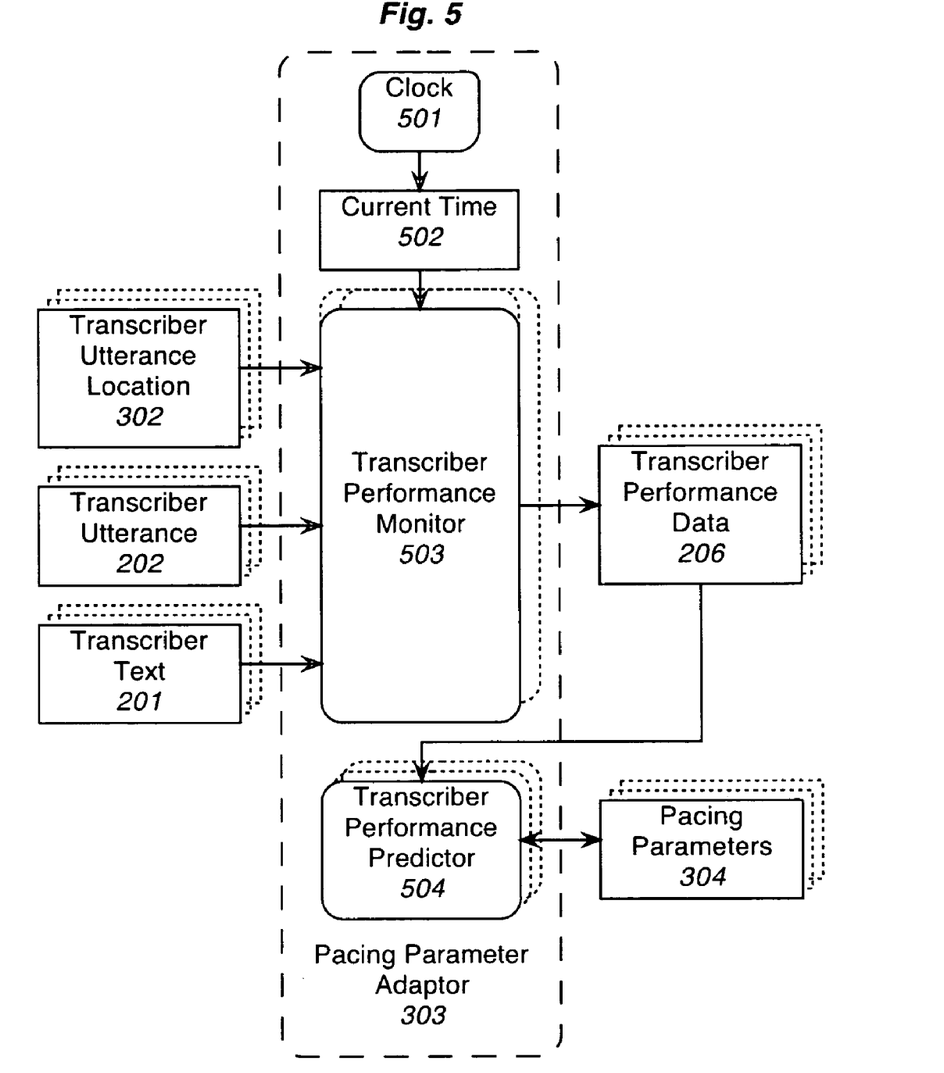
FIG. 5 is an information-flow diagram of one embodiment of the pacing-parameter adaptor.

As shown in information flow diagram FIG. 5, pacing parameter adaptor comprises clock 501, one or more transcriber performance monitors 503, and one or more transcriber performance predictors 504. It uses these components to track the speed and accuracy of each transcriber for each transcribee and to adjust the transcribers' individual pacing parameters accordingly.

Clock 501 keeps track of the current time 502, which it outputs to transcriber performance monitor 503.

Transcriber performance monitor 503 inputs transcriber texts 201 and transcriber utterances 202 on the fly as they are produced, and uses transcriber utterance locations 302 and clock 501 to measure and record transcriber performance data 206 for each transcriber for each transcribee transcribed by that transcriber. Transcriber performance data 206 includes such measures as the delay between presentation of a paced transcribee utterance 103 (see FIG. 1) to the transcriber before the transcriber begins transcribing or repronouncing the utterance; the duration of the portion of the transcribee utterance transcribed before the transcriber pauses; how long it takes for the transcriber to transcribe or rearticulate that portion of the utterance; and the transcriber's average text output speed as a typist or machine transcriber in terms of letters or words, or the transcriber's average speaking speed as a voicewriter in terms of phones, moras, syllables or feet. In addition, by comparing the transcriptions produced by different transcribers for the same transcribee utterance, transcriber performance monitor 503 measures and records the transcriber accuracy.

Transcriber performance predictor 504 analyzes the transcriber performance data for prior utterances and the pacing parameters 304 used to present those utterances, and adjusts the pacing parameters accordingly.

Pacing parameters 304 include the current location in the original speech at which the next transcription is to begin; the duration to pause before presenting the transcribee utterance; the duration of history before the current location to present as context, if any; the duration of the current portion expected to be transcribed at once; the duration of lookahead beyond the current portion to present as context, if any; the tempo at which to present the prior context aurally; the tempo at which to present the current portion aurally; and the tempo at which to present the posterior context aurally.

The pacing parameters adapt to the transcriber and transcribee in order to maximize the transcription efficiency, in terms of speed and accuracy, where the relative importance of these two criteria depends on the client's needs.

Ideally, for lucid speech, which the human transcriber can recognize on a single hearing, the transcription pacing system presents the speech at the fastest tempo that the transcriber can comfortably keep up with, and with a lead short enough for the transcriber to keep in working memory yet long enough to for the transcriber to unambiguously recognize the speech in time to transcribe it. The comfortable tempo for lucid speech depends only on the transcriber's typing or voicewriting skill, typically in the range of 40 ... 80 words per minute for a typist of average to good skill, and in the range of 80 ... 160 words per minute for a voicewriter of average to good skill. The comfortable lead time is typically a few seconds. When paced appropriately, lucid speech is indicated by fluent transcription, without pauses. The transcription pacer paces the speech presentation to match the transcriber's transcription speed, in terms of prosodic units such as syllables. It does this by altering the durations of naturally occurring pauses and the pitch-preserving playback tempo. Specifically, for transcribers who accurately transcribe faster than the transcribee speaks, the pacing parameter adapter shortens naturally occurring pauses from a default normalized duration (typically around half a second), and increases the speech tempo; and for transcribers who transcriber more slowly than the transcribee's speaking tempo, the pacer first slows the playback to the minimum intelligible tempo, and then, if necessary, increases the duration of the pauses. Thus if the transcriber speeds up or slows down, the pacer responds by speeding up or slowing down commensurately, and if the transcriber pauses, the pacer responds by pausing.

If the transcriber pauses longer than the transcriber pause threshold, typically a few seconds, then the pacer assumes that the speech is illucid, and automatically repeats the untranscribed portion of the utterance, along with sufficient prior and posterior context to unambiguously recognize the portion to be transcribed. On subsequent repetitions, the tempo is gradually slowed until the minimum tempo is reached, and the context is gradually increased until the maximum prior and posterior context durations are reached. Upon reaching the maximum repetition count, the pacer inserts a transcription token representing unrecognized speech, and moves on, resuming the prior pace. If the transcriber also fails to transcribe the subsequent portion, then in the absence of other input from the transcriber, the transcription manager assumes that the transcriber has ceased transcribing for the time being, and reassigns the untranscribed portion of the utterance to another transcriber.

A transcriber can also directly enter a token indicating that a phrase is ambiguous, unrecognizable or unintelligible, in which case the pacer continues presenting the utterance to that transcriber as though the phrase had been properly transcribed.

At any time, a human transcriber may interrupt the normal flow by taking other actions, such as directing the pacer to re-present a prior portion of the speech for confirmation or correction, edit the transcription, pause, or cancel the transcription. Following such an interruption, the pacer resumes from the prior location at the prior pace.

Although the pacing parameter adaptor is designed to operate fully automatically, it can also be overridden by a human transcriber 106 (see FIG. 1). For example, the transcriber can alter the prior and posterior context durations via graphical user interface controls, by typing keyboard commands, or by issuing verbal commands through a speech recognizer.

While the utility of a transcription pacing system should be apparent to any human transcriber who has ever had to stop a recording that was getting too far ahead, rewind a recording to repeat an unintelligible utterance, or wait through a long pause, transcription pacing can also improve the efficiency of machine speech transcription. Specifically, although machine transcribers have perfect memory and thus cannot benefit from utterance repetition, they can benefit from adjustment of playback speed, context duration, and pause duration. Playback speed is important because machine speech transcribers are statistically based, so speech may fall outside the machine speech transcriber's statistically reliable range by being either too fast or too slow, and thus degrade its accuracy; and even if the accuracy at a given playback speed is adequate, the machine transcriber may be able to handle faster speech without significant degradation in accuracy. Pause duration is important because even if the speech is slow enough for accurate recognition, it may be faster than the actual operation of the speech recognizer, so the natural pauses in an utterance may need to be lengthened to prevent a backlog; on the other hand, if the speech recognizer is faster than the speech, natural pauses can be shortened accordingly. Moreover, some machine speech transcribers using structural syntax models wait for a pause exceeding a threshold duration before outputting any text, so for voicewriting feedback, real-time transcription, and other cases where low latency is required, the pacer may need to insert pauses. When transcribing an utterance with a machine speech recognizer using a pleogrammatic syntax model, the transcription pacer can improve the accuracy by increasing the prior and posterior contexts to the maximum contextual basis of the syntactic model; and when using a structural syntax model, the accuracy can be improved by including enough context for a complete phrase, clause, or sentence.

Figure 6:
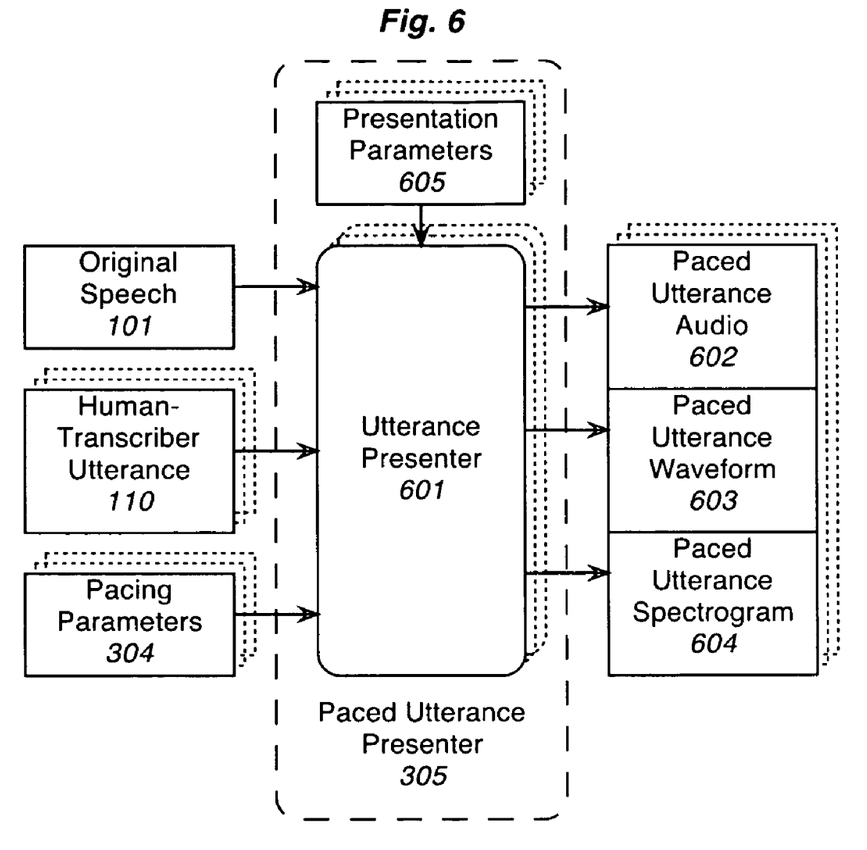
FIG. 6 is an information-flow diagram of one embodiment of the paced utterance presenter.

As shown in information-flow diagram FIG. 6, paced utterance presenter 305 comprises one or more utterance presenters 601. An utterance presenter 601 uses pacing parameters 304 for a particular transcriber to select the portion of original speech 101 or human-transcriber utterance 110 to present to that transcriber as paced utterance 204 (see FIG. 2), and presents it, according to the transcriber's preferences as recorded in presentation parameters 605, as paced utterance audio 602, and optionally in visual forms such as paced utterance waveform 603 and paced utterance spectrogram 604.

When multiple transcribers are available, paced utterance presenter 305 chooses among them so as to minimize the cost for the desired speed and accuracy. For example, assuming machine transcription is the cheapest, if machine transcription of the original speech being transcribed is expected to yield a transcription of adequate accuracy for the purpose at hand, then paced utterance presenter 305 feeds transcribee utterance 103 only to machine transcribers, with occasional spot-checks by expert human transcribers. As another example, if high accuracy is essential for a difficult speaker but the transcription is not urgent, the utterance presenter selects one or more accurate but relatively unskilled human transcribers. As yet another example, if both accuracy and speed are more important than cost, the utterance presenter selects one or more accurate and skilled voicewriters.

Figure 7:
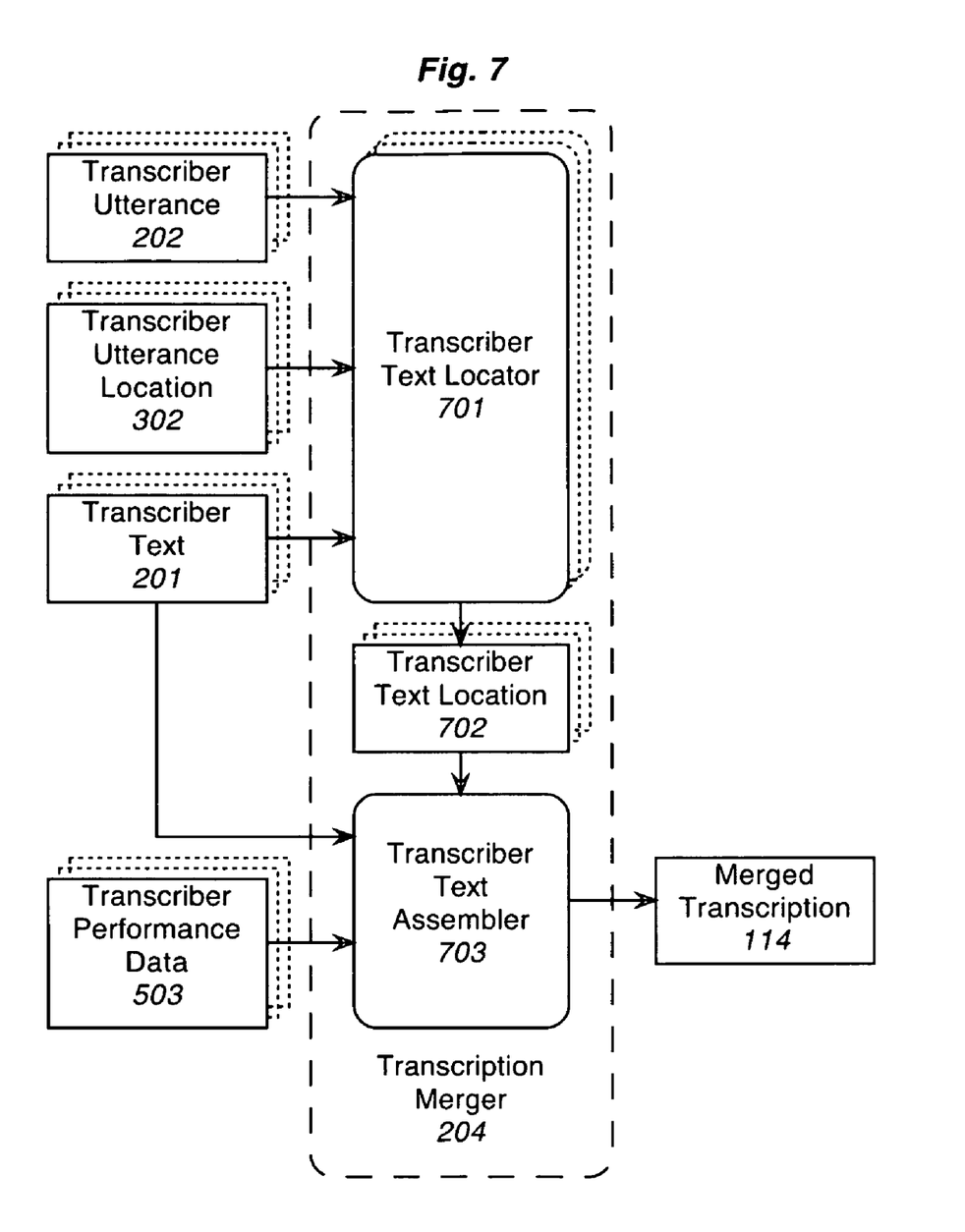
FIG. 7 is an information-flow diagram of one embodiment of the transcription merger.

As shown in information-flow diagram FIG. 7, transcription merger 205 comprises one or more transcriber text locators 701 and transcriber text assembler 703. It uses these components to assemble transcribed utterances 201 into final merged transcription 114.

A transcriber text locator 701 inputs a transcriber utterance 202 and the associated transcriber text 201, which may be either voicewriter utterance 110 (see FIG. 1) and corresponding machine-transcriber text 105, respectively; or lector utterance 113 and corresponding direct machine-transcriber text 105 or corrected human-transcriber text 109. A transcriber text locator 701 first aligns transcriber text 201 with transcriber utterance 202, and then uses corresponding transcriber utterance location 302, output by transcriber utterance locator 301 (see FIG. 4), to align the transcriber text with the corresponding portion of original transcribee speech 101, to produce transcriber text location 702.

A transcriber text location 702 consists of time correspondence data relating the textual graphemic units in corresponding transcriber text 201 to the corresponding textual graphemic units within merged transcription 114.

A transcriber text locator 701 matches the text with the original speech both in order to permit transcriber text assembler 703 to assemble transcriber texts 201 into merged transcription 114, and so that the system can re-present speech corresponding to text selected by the voicewriter at random via the text editor for correction.

In a tightly integrated system, the transcription text locator obtains transcriber text location information 702 directly from the speech recognizer 104 (see FIG. 1) in the case of voicewriting, and directly from the synthesizer 112 in the cases of a machine lector resynthesizing direct machine or human transcription. Otherwise, when used for voicewriting with commercial speech recognizers that transcribe speech a word at a time on the fly, as is typical for speech recognizers using pleogrammatic syntax models, the text locator aligns the text directly to the voicewriter's speech a word at a time as it is uttered and transcribed. When used for direct transcription or for voicewriting with longer delay, such as with speech recognizers that transcribe a sentence at a time, as is typical for speech recognizers using structural syntax models, the text locator aligns the text to the speech by synthesizing the text a word at a time. For written languages in which the context strongly determines the pronunciation of graphemic words, multiple synthesis attempts of different lengths of text may be required to adequately match the synthesized lector utterance 113 and hence the transcriber text 202 with the transcribee utterance 103.

Transcriber text assembler 703 assembles transcriber texts 201 into merged transcription 114 using associated transcriber text locations 702.

If any ambiguities are present, merged transcription 114 is represented as a directed graph, with branches originating from an individual transcriber scored by that transcriber, and branches between transcribers scored by transcriber performance data 206. Possible transcriptions of a passage are then presented to human transcribers in order of decreasing overall score for disambiguation, for example as items in a pop-up menu.

The system architecture depicted in these figures and described herein is given merely as an example for the purposes of explanation. Other, equivalent architectures will be obvious to those skilled in the art.

We claim:

1. A method comprising:

performing, by a processor, operations of:

recording input speech where a pace of the input speech varies over time;

automatically monitoring, the pace of the input speech;

presenting the input speech to at least one of an automated speech recognizer or external transcribers at a presentation pace;

at least one of performing speech recognition on the input speech which produces a text transcription of the input speech or receiving text transcription from the external transcribers;

performing text-to-speech synthesis on the text transcription of the input speech which produces synthesized speech containing spoken versions of the words in the text transcription of the input speech, where the pace of the synthesized speech varies over time;

automatically monitoring the pace of the synthesized speech;

dynamically adjusting the presentation pace to match the pace of the synthesized speech based on an acoustic match between the synthesized speech and the input speech;

continuously re-adjusting the presentation pace based on the acoustic match to compensate for changes in the input speech including changes in the input speech pace, vocabulary use, repetitions, and non-speech sounds.

2. The method of claim 1 wherein the input speech is a live conversation.

3. The method of claim 1 wherein the input speech is previously recorded conversations in non-real time.

4. The method of claim 1 wherein the input speech is broken into a multitude of small snippets and is transcribed by multiple transcribers in at least one of sequentially or in parallel.

* * * * *